US006979986B2

(12) United States Patent
Liegeois

(10) Patent No.: US 6,979,986 B2
(45) Date of Patent: Dec. 27, 2005

(54) SWITCH SHUNT REGULATOR AND POWER SUPPLY ARRANGEMENT USING SAME FOR SPACECRAFT APPLICATIONS

(75) Inventor: Bruno Ghislain Liegeois, Gembloux (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/862,460

(22) Filed: Jun. 8, 2004

(65) Prior Publication Data
US 2004/0251885 A1 Dec. 16, 2004

(30) Foreign Application Priority Data
Jun. 11, 2003 (EP) .................................. 03291381

(51) Int. Cl.[7] .............................................. G05F 1/40
(52) U.S. Cl. ....................................................... 323/282
(58) Field of Search ............................... 323/268, 282, 323/283, 351

(56) References Cited

U.S. PATENT DOCUMENTS

| 4,341,990 | A | * | 7/1982 | Davis | 323/303 |
| 5,444,358 | A | * | 8/1995 | Delepaut | 323/222 |
| 5,844,403 | A | | 12/1998 | Sugimoto et al. | |
| 6,903,537 | B2 | * | 6/2005 | Tzeng et al. | 323/268 |

FOREIGN PATENT DOCUMENTS

EP          0 614 136 A      9/1994

OTHER PUBLICATIONS

D. O'Sullivan et al, "The Sequential Switching Shunt Regulator S3R", Proceedings of the Third Estec Spacecraft Power Conditioning Seminar, Sep. 21, 1997, pp. 123-131, XP009020315q.

* cited by examiner

Primary Examiner—Adolf Berhane
(74) Attorney, Agent, or Firm—Sughrue Mion, PLLC

(57) ABSTRACT

A Sequential Shunt Switching Regulation cell [S3R] adapted to connect a power source, such as a solar array panel (SAi), to a users bus (Vbus) under control of a signal (INCTRi). The cell (S3R) comprises a phase anticipator circuit (PAC) adapted to reduce the delay between the moment the control signal is received and the moment the power source is connected to the bus, modifying thereby the hysteresis due to parasitic capacitances of the cell and the solar array. Several such cells are included in a power supply arrangement including a power conditioning and distribution unit (PCDU) comprising also a mean error amplifier (MEA) adapted to detect the voltage (OUTS3R) at the user bus and to provide corresponding control signals to the cells. Owing to the phase anticipator circuits in the cells, double sectioning is avoided. In other words, a power source (SAi) is connected to the bus before the mean error amplifier requires the connection of a second one (SAj).

10 Claims, 4 Drawing Sheets

SWITCH SHUNT REGULATOR AND POWER SUPPLY ARRANGEMENT USING SAME FOR SPACECRAFT APPLICATIONS

The present invention relates to a switch shunt regulator having a power input terminal connected to a power source and coupled to a power output terminal to which a load is connected, said regulator comprising a comparator having a comparator output coupled to an input of a controlled shunt switch, said switch being connected between said power input terminal and a mass terminal, said comparator being adapted to activate said controlled shunt switch upon comparison of a voltage received at a control input of said regulator with a reference voltage applied at a reference input of said comparator, and said comparator activating said controlled shunt switch a predetermined delay after having performed said comparison.

Such a switch shunt regulator is already known in the art as a Sequential Shunt Switching Regulation cell [S3R], and a problem therewith is that, due to the presence of parasitic capacitances, the regulator is subjected to a hysteresis whereby the controlled shunt switch is not activated immediately after the comparison operation. Since it is obvious that, especially in critical applications, the shorter the activation delay is, the better the performances are, it appears to be necessary to reduce the activation delay of the switch.

A first solution to reduce the activation delay of the switch could be to implement a bus capacitance at the load side in order to meet same bus performances, i.e. impedance and transient response, than with standard known solar array technology having a low parasitic capacitor. However, such an additional bus capacitance implicates an increase of mass, volume and cost.

It is to be noted that with all technology of solar array panels used in space applications, the parasitic capacitance is relatively low, and the risks presented here above can be eliminated by a minor increasing of the bus capacitance. However, with new technologies, like multi-junction, the parasitic capacitance is multiplied by five and the bus capacitance over-sizing cannot be ignored.

An object of the present invention is to provide a switch shunt regulator wherein the activation delay of the controlled shunt switch is optimized without increasing parameters such as mass, volume and cost.

According to the invention, this object is achieved due to the fact that said switch shunt regulator further comprises a phase anticipator circuit coupled between the input of said comparator and the output of said controlled shunt switch, said phase anticipator circuit being adapted to reduce the first mentioned predetermined delay between said comparator having performed said comparison and said switch being activated to a second predetermined delay relatively shorter than said first predetermined delay.

In this way, the phase anticipator circuit introduces a dynamic threshold in the hysteresis of the comparator allowing anticipating the activation of the switch and thereby reducing the activation delay mainly due to charging of parasitic capacitances.

In more detail, the present invention is characterized in that said comparator comprises an operational amplifier having a first comparison input coupled to said control input, a second comparison input coupled to said reference input, and an output coupled to said comparator output and further to an input of said phase anticipator circuit, and in that said phase anticipator circuit comprises a resistor and a capacitor coupled in parallel between said comparator output and said switch input, and further comprises a diode connected between said switch input and said mass terminal.

The architecture of the phase anticipator circuit comprising the resistor, the capacitor and the diode connected as indicated allows accelerating the activation of the switch as a result of the voltage comparison performed by the comparator.

The present invention also relates to a power supply arrangement including a power conditioning and distribution unit having a plurality of arrangement input terminals connected to outputs of power sources and having a power output terminal to which a load is connected, said power conditioning and distribution unit comprising a mean error amplifier having a detection input connected to said power output terminal and control outputs connected to respective control inputs of a plurality of sequential switch shunt regulators, each of said sequential switch shunt regulators having a power input terminal connected to one of said power sources and having an output connected to said power output terminal, each of said regulators further comprising a comparator having a comparator output coupled to an input of a controlled shunt switch, said switch being connected between said power input terminal and a mass terminal, said comparator being adapted to activate said controlled shunt switch upon comparison of a voltage received at the control input of the regulator with a reference voltage applied at a reference input of said comparator, and said comparator activating said controlled shunt switch a predetermined delay after having performed said comparison.

Such a power supply arrangement is also already known in the art, e.g. in spacecraft applications. Therein, the power sources are constituted by solar arrays panels that are connected to the load via the power conditioning and distribution unit and under control of the mean error amplifier. A Power Conditioning and Distribution Unit [PCDU] is for instance disclosed at the Internet site:

<http://www.esa.int/est/prod/prod0303.htm>.

The mean error amplifier controls the switch shunt regulators to connect and to disconnect, via the associated controlled shunt switches, different power sources to the load according to the power requirements of the latter. However, due to the presence of parasitic capacitances, each regulator is subjected to a hysteresis whereby its controlled shunt switch is not activated immediately after the comparison operation.

Another object of the present invention is to provide a power supply arrangement of the known type but wherein the activation delay of the controlled shunt switch of the different sequential switch shunt regulators is optimized.

According to the invention, this other object is achieved due to the fact that each of said switch shunt regulators further comprises a phase anticipator circuit coupled between the output of said comparator and the input of said controlled shunt switch, said phase anticipator circuit being adapted to reduce the first mentioned predetermined delay between said comparator having performed said comparison and said switch being activated to a second predetermined delay relatively shorter than said first predetermined delay.

In this way, for each switch shunt regulators of the power supply arrangement, the phase anticipator circuit introduces a dynamic threshold in the hysteresis of the comparator allowing anticipating the activation of the corresponding switch and thereby reducing the activation delay.

In a preferred embodiment, the present invention is further characterized in that for each variation, by a predetermined voltage value, of the voltage at said power output terminal, said mean error amplifier switches an appropriated one of its control outputs from a low value to a high value, and vice versa.

In this way, the controlled shunt switches of different switch shunt regulators are activated by the mean error amplifier according to the voltage at the power output terminal. In other words, when the voltage at the power output terminal decreases, the mean error amplifier controls the regulators to connect more power sources to the load by activating more switches, and vice versa. Owing to the phase anticipator circuits included in each switch shunt regulator, the connection of additional power sources is dramatically increased and an optimal regulation of the voltage at the power output terminal is achieved.

Another characterizing embodiment of the present invention is that the delay for the voltage at said power output terminal to change by said predetermined voltage value is shorter than said first predetermined delay and larger than said second predetermined delay.

This avoids the effect of "double sectioning" whereby, due to the activation delay of the controlled shunt switches, the mean error amplifier may control the activation of a second switch while the first switch is not yet activate upon a previous request of the mean error amplifier. This effect will be explained in more detail later in the specification of the invention.

Yet another characterizing embodiment of the present invention is that the switch shunt regulator is used in a spacecraft, and that said power sources are solar array panels.

Although applicable to other application, and particularly for vehicles, the present invention best suits for spacecraft applications It is finally to be noted that a further characterizing embodiment of the present invention is that, when said switch is activated, said power input terminal is disconnected from said mass terminal.

In case of solar array panels, this means that the latter are shorted to the mass or ground terminal when not used.

Further characterizing embodiments of the present power supply arrangement and switch shunt regulators used therein are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
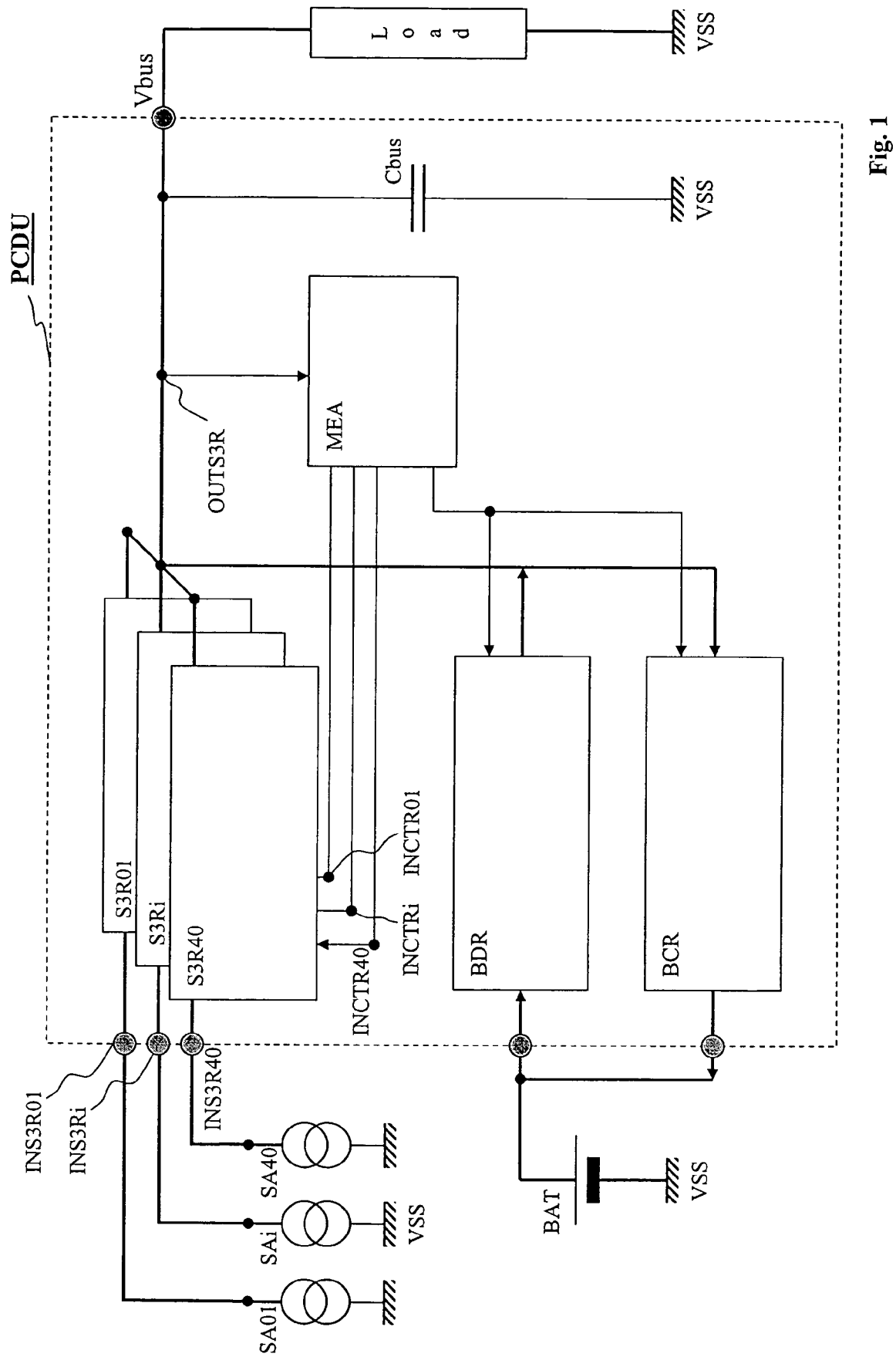
FIG. 1 represents a power supply arrangement for a spacecraft application according to the invention.

The power supply arrangement shown at FIG. 1 is preferably, but not exclusively, intended for spacecraft applications where energy is supplied by different power sources and has to be distributed to different bus users, generally indicated by LOAD. A satellite is for instance provided with two kinds of power sources: about N=40 solar array panels SA01 . . . SAi . . . SA40, and several batteries, generally indicated by BAT, all connected to a reference ground or rather mass voltage VSS at a like-named mass terminal. The conditioning of the power sources available on board of the spacecraft and the subsequent power distribution to the bus users occur under control of a Power Conditioning and Distribution Unit PCDU. In order to provide a regulated bus voltage to supply the spacecraft users LOAD via an output terminal Vbus, the PCDU comprises several Sequential Shunt Switching Regulation cells [S3R], hereafter also called switch shunt regulators S3R01 . . . S3Ri . . . S3R40. Each switch shunt regulator, say S3Ri, has an output OUTS3R connected to the bus users LOAD via the common output Vbus of the power conditioning and distribution unit PCDU, and has an input INS3Ri to which a distinct solar array panel SAi is connected.

Since the solar array panels can only provide energy during sunlight, the power supply arrangement is also provided with batteries BAT already mentioned and adapted to provide energy when it is dark, i.e. during the night. The PCDU therefore further comprises a Battery Discharge Regulator BDR and a Battery Charge Regulator BCR. The BDR has an input connected to the batteries BAT and an output connected to the output OUTS3R for providing the energy of the battery to the bus users, whilst the BCR as an input connected to OUTS3R and an output connected to BAT for reloading the batteries when the solar array panels are providing sufficient energy. The batteries BAT and their regulators BDR and BCR will not be described in more details hereafter because they are not the subject of the present invention.

The unit PCDU is finally provided with a Mean Error Amplifier MEA and has a bus capacitance Cbus connected between the output OUTS3R and the mass terminal VSS. The mean error amplifier MEA has an input connected to the output(s) OUTS3R and has outputs connected to control inputs INCTR01 . . . INCTRi . . . INCTR40 of respective switch shunt regulators and to control inputs of the battery discharge regulator BDR and the battery charge regulator BCR, respectively.

Figure 2:
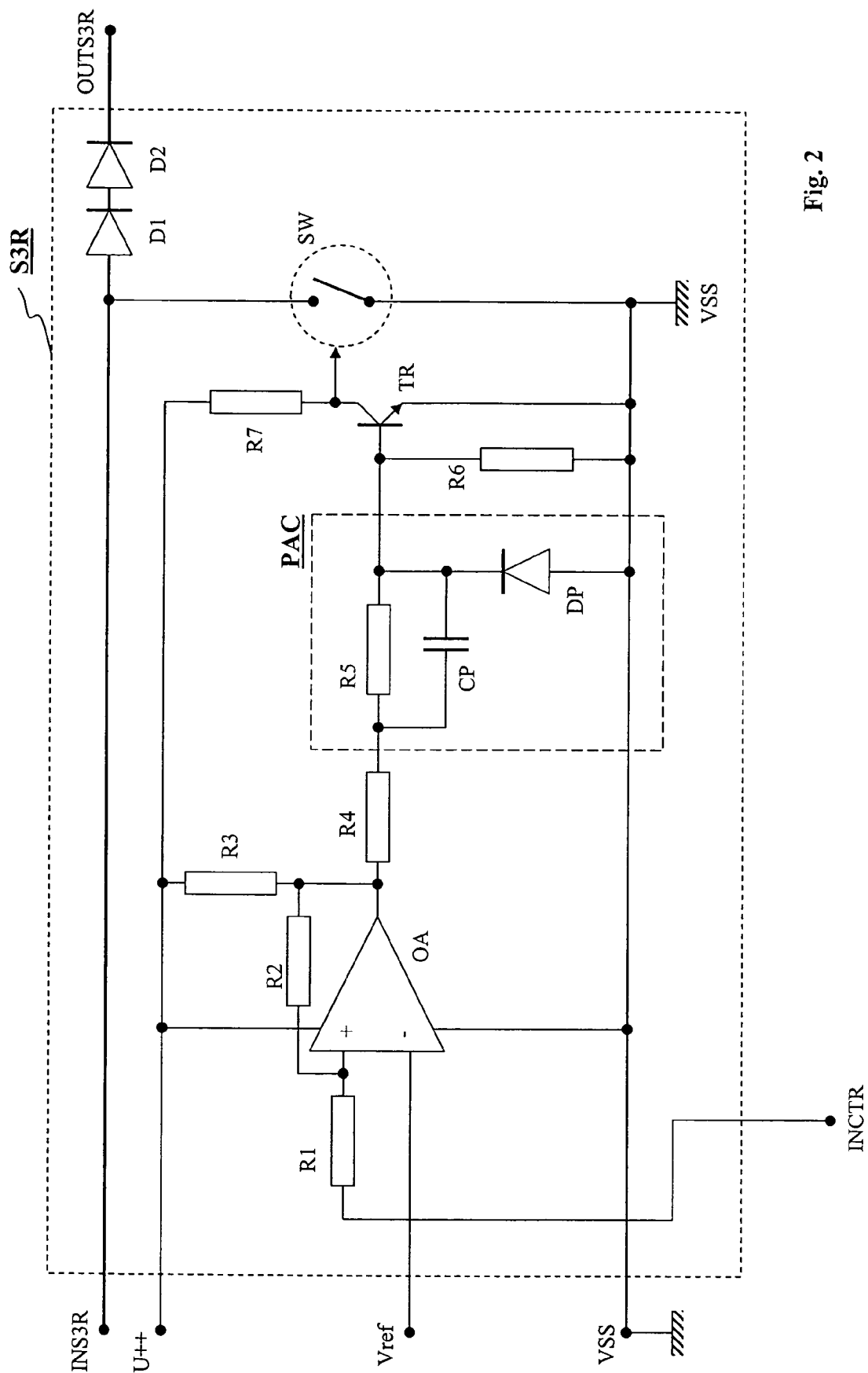
FIG. 2 represents a switch shunt regulator, also according to the invention, and used in the power supply arrangement of FIG. 1.

The switch shunt regulators S3R01 . . . S3Ri . . . S3R40 are all similar. Therefore, only one, say S3R, is represented at FIG. 2. The switch shunt regulator S3R comprises a comparator constituted by an operational amplifier OA and resistors R1 to R4. The operational amplifier OA is coupled between a supply voltage terminal U++ and the mass terminal VSS, and has a non-inverting input + coupled to the control input INCTR via resistor R1, an inverting input − connected to a reference input Vref of S3R at which a like-named voltage reference is applied, and an output coupled to an output of the comparator via resistor R4. Resistor R2 is connected in feedback between the output of OA and its non-inverting input +, and resistor R3 is connected between the output of OA and the supply voltage terminal U++.

The output of the comparator of S3R is connected to an input of a phase anticipator circuit PAC that comprises a resistor R5 coupled in parallel with a capacitor CP between the input and an output of PAC. The phase anticipator circuit PAC further comprises a diode DP connected between the mass terminal VSS and the output of PAC.

The output of the phase anticipator circuit PAC is further coupled to a controlled shunt switch SW connected between the mass terminal VSS and the power input terminal INS3R of the switch shunt regulator S3R. A driver circuit for the switch SW is provided at the output of the phase anticipator circuit PAC. The driver circuit comprises resistors R6 and R7 and a transistor TR of which the collector electrode is coupled to the controlled shunt switch SW and to the supply voltage terminal U++ via resistor R7. TR further has its emitter electrode connected to the mass terminal VSS and its base electrode connected to the output of PAC and coupled to the mass terminal VSS via resistor R6.

The switch shunt regulator S3R finally comprises two protection diodes D1, D2 series connected between the input terminal INS3R and the output terminal OUTS3R.

The comparator of the switch shunt regulator S3R is adapted to activate the controlled shunt switch SW upon comparison of the voltage received at the control input INCTR with the reference voltage Vref.

Figure 3:
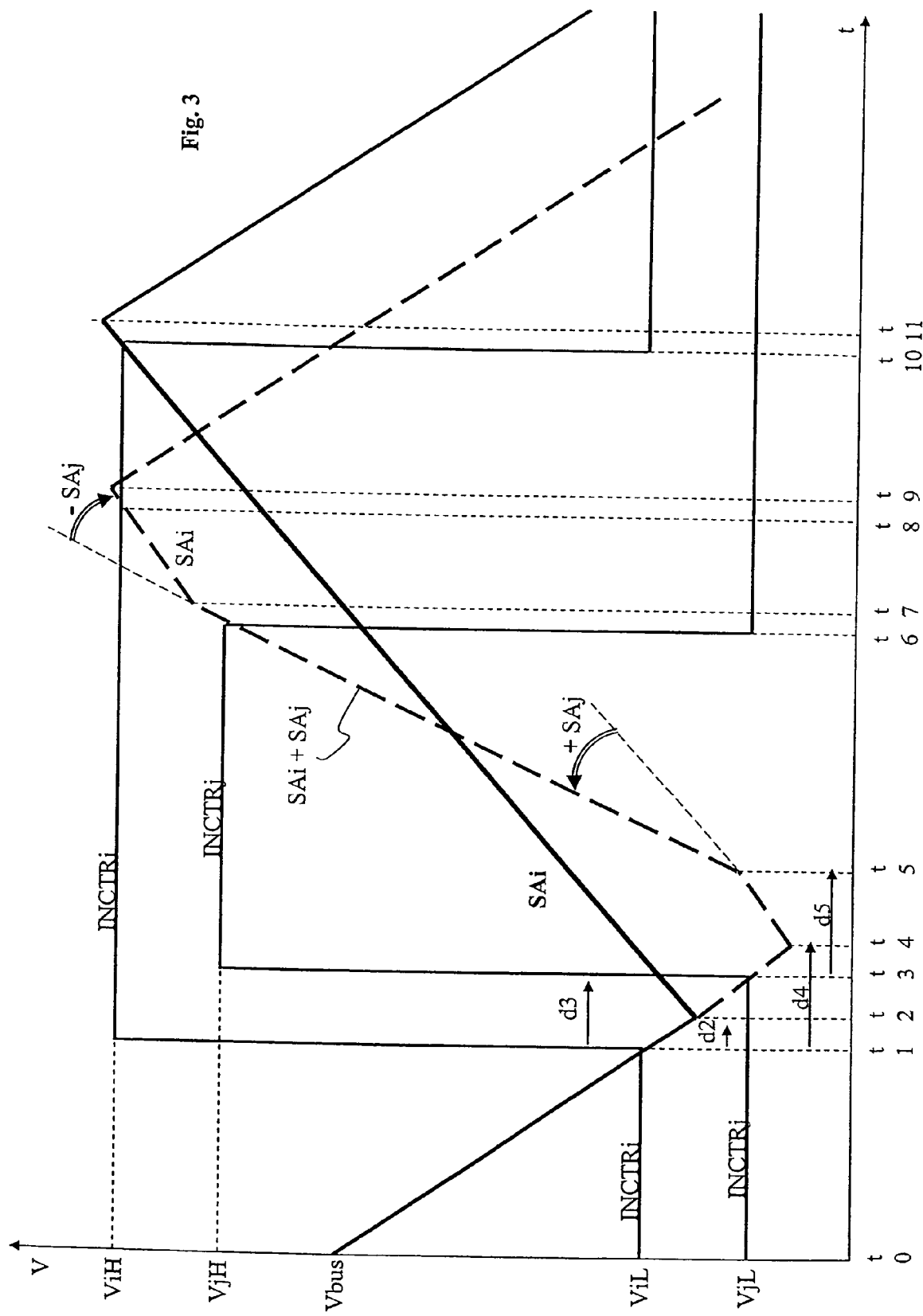
FIG. 3 shows variations of the output voltage of the switch shunt regulator and of the power supply arrangement with and without the use of a phase anticipator circuit according to the present invention.

The operation of the power conditioning and distribution unit PDCU and more particularly of the sequential shunt switching regulation cells or switch shunt regulators S3R01 . . . S3Ri . . . S3R40 will be explained below by making reference to FIG. 3. Therein, an example of variation, in function of the time t, of the voltage on the bus, i.e. at the terminal Vbus, is represented.

To provide a predetermined voltage to the bus users LOAD, i.e. at the terminal Vbus, a number of the solar array panels are connected to the terminal OUTS3R via their respective switch shunt regulator or S3R cell of which the controlled switch is then open. The mean error amplifier MEA controls the operation of the switch shunt regulators, and thus the status of the controlled shunt switches thereof. Each solar array panel, also called section, provides a voltage of about 2 Volts. When the shunt switch SW of the corresponding switch shunt regulator S3R is open, this voltage is supplied to the output terminal OUTS3R and further to, the users bus Vbus through the protection diodes D1 and D2.

In the following example with N=40 cells S3R, let's suppose that, at a predetermined time, say t0:
  "n" panels or SA sections are connected to the bus,
  "N−n−1" SA sections are shunted, and
  1 SA section, e.g. the section SAi, is in switching mode, also called PWM mode.

It is to be noted that the switching frequency of the shunt switch regular or S3R cell S3Ri in PWM [Pulse Width Modulation] mode depends on the bus impedance and the bus ripple requirements, and is fixed by the design of the hysteresis level implemented in each S3R cells.

When the voltage at the terminal Vbus drops, e.g. because more users are become connected, this variation is detected by the mean error amplifier MEA at the terminal OUTS3R. The mean error amplifier MEA then controls the opening of an additional shunt switch SW by the corresponding switch shunt regulator, say S3Ri, via its control input INCTRi. The object of this operation is to supply the voltage of the additional solar array panel or section SAi, at the input terminal INS3Ri, to the output terminal OUTS3R. By adding the voltage of the panel SAi to the already available output voltage at Vbus, the latter output voltage tends to increase back to the requested value.

In the switch shunt regulator S3Ri, the controlled switch is opened as a result of the comparison of the voltage received at the control terminal INCTRi with the voltage at the reference terminal Vref. The operational amplifier OA, as shown at FIG. 2, then controls the transistor TR of the driver circuit to open the controlled switch SW. Referring again to FIG. 3, the controlled shunt switch of S3Ri will be controlled to open when the voltage INCTRi provided by MEA switches up to a value ViH, as at a time t1, whilst, the controlled shunt switch will be controlled to close when the voltage INCTRi switches down to a value ViL, as at a time t10.

A problem is that a switch shunt regulator S3R is subjected to a hysteresis because of its parasitic capacitances. As a result, the controlled shunt switch SW is not activated immediately upon request of the control signal INCTRi. In a, theoretical, best case, the controlled shunt switch SW opens at a time t2, i.e. a delay d2 after INSTRi has switched from ViL to ViH, the delay d2 corresponding the time interval between t1 and t2. This case will be analyzed in more detail later owing to the use of the phase anticipator circuit PAC.

However, in reality, the delay to open the switch SW is longer, e.g. a delay d4, so that the bus voltage Vbus has already dropped below a second value VjL before the controlled shunt switch of S3Ri is opened and the voltage of the panel SAi is added to Vbus in order to increase it. The voltage VjL is the voltage at which the mean error amplifier MEA controls a second additional switch shunt regulator, say S3Rj, via its control input INCTRj to open its controlled shunt switch in order to supply the voltage of the solar array panel SAj to the output terminal OUTS3R as well. The switching of the control voltage INCTRj from the value VjL to the value VjH occurs at a time t3 corresponding to a delay d3 after the time t1. The delay d3, equal to the time interval between t1 and t3, is shorter than the delay d4, equal to the time interval between t1 and t4, necessary to open a controlled shunt switch SW after having received the control signal INCTR at the corresponding switch shunt regulator S3R. As a consequence, a so-called "double sectioning" occurs, meaning that the panel or section SAj will provide a voltage to the bus although only the voltage of the section SAi was required to increase the value of Vbus. This is a consequence of the too slow reaction time of the switch shunt regulator S3R, i.e. the hysteresis thereof.

A double sectioning corresponds to have two S3R cells in PWM mode at a time and working at double switching frequency. This is one of the risks caused by the parasitic capacitance of an SA section, a value function on the SA technology that puts off the SA section connection on the bus. This parasitic capacitance also leads to instability in the main bus regulation due to phase shift in the voltage loop. Double sectioning will be explained below by making reference to the dashed line of FIG. 3. As already said, this corresponds co switch shunt regulators S3R without phase anticipator circuits PAC.

At the time t1, the decreasing bus voltage Vbus reaches a value ViL. The mean error amplifier MEA detects, at the terminal OUTS3R, this low level ViL. MEA then controls the signal INCTRi to increase up to a high level ViH. The voltage INCTRi applied to the comparator of S3Ri causes the latter to provide an output signal that controls the opening of its shunt switch SW. As a result, the voltage of the solar array panel SAi, applied at the input terminal INS3Ri of S3Ri is provided to the output terminal OUTS3R.

Without the phase anticipator circuit PAC, the reaction time of S3R is such that the shunt switch SW opens only at a time t4, i.e. a delay d4 after t1. However, during that delay d4, the bus voltage Vbus has already reached a second low level VjL, at a time t3, corresponding to a delay d3 after t1, d3 being shorter than d4. The mean error amplifier MEA also detects, at the terminal OUTS3R, this second low level VjL. MEA then controls the signal INCTRj to increase up to a high level VjH. It is to be noted that the difference between the voltage ViL and VjL, as well as between the voltages ViH and VjH is of about 2 Volts, corresponding to the voltage provided by a solar array panel SA. The voltage INCTRj applied to the comparator of S3Rj causes the latter to provide an output signal that controls the opening of its shunt switch SW.

At the time t4 (after t3), the shunt switch of S3Ri opens and the voltage of SAi is applied to OUTS3R, whereby the voltage Vbus starts to increase. At a time t5, the shunt switch of S3Rj opens in turn and the voltage of SAi is also applied to OUTS3R (+SAj at FIG. 3), whereby the voltage Vbus increases faster. The time t5 occurs a delay d5 after the time t3 and corresponds to the reaction time of S3Rj. The delay d5, equal to the time interval between t3 and t5, is substantially equal to the delay d4, equal to the time interval between t1 and t4.

When, at a time t6 (after t5), the increasing voltage Vbus reaches the value VjH, MEA controls S3Rj to close its shunt switch, via the control voltage INCTRj that decreases back to the low level VjL. At a time t7, shortly after t6, the shunt witch of S3Rj closes as a result of the output of the comparator of S3Rj, whereby the voltage of the panel SAj is no longer applied to OUTS3R. The increase speed of Vbus is then reduced (-SAj at FIG. 3) since, after t7, only the voltage of the panel SAi is provided.

At a time t8 (after t7), the increasing voltage Vbus reaches the value ViH, MEA then controls S3Ri to close its shunt switch, via the control voltage INCTRi that decreases back to the low level ViL. At a time t9, shortly after t8, the shunt witch of S3Ri closes as a result of the output of the comparator of S3Ri, whereby the voltage of the panel SAi is no longer applied to OUTS3R. The voltage Vbus then tends to reduce because none of the additional voltages of the panels SAi and SAj is provided.

It appears from the previous that the switching-in of the second additional panel SAj was not necessary and should be avoided.

The solution to eliminate the double sectioning is to introduce in the hysteresis of each switch shunt regulator S3R a dynamic threshold allowing to anticipate the connection of a solar array panel SA on the bus in order to eliminate the delay due to the parasitic capacitance charging, and to avoid phase shift in the bus voltage regulation loop. The phase anticipator circuit PAC provides this solution.

Figure 4:
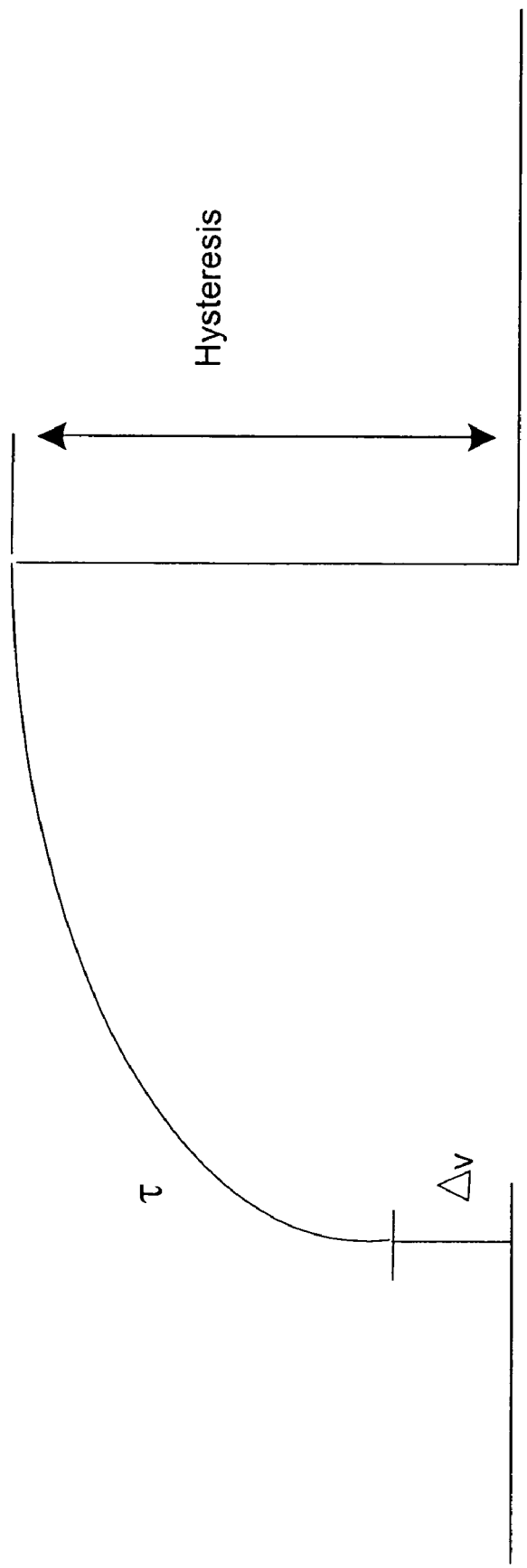
FIG. 4 represents the hysteresis curve of the switch shunt regulator of FIG. 2.

Owing to the phase anticipator circuit PAC, the hysteresis of the shunt switch regulator S3R of FIG. 2 becomes as shown at FIG. 4, wherein:

$$\text{Hysteresis} = \frac{U^{++} * (R4 + R5)}{R3 + R4 + R5} * \frac{R1}{R2}$$

$$\Delta V = \frac{U^{++} * R4}{R3 + R4} * \frac{R1}{R2}$$

$$\tau = CP * (R4 + R3) // R5$$

The phase anticipator circuit PAC dynamically adapts one of the two hysteresis levels implemented in each S3R cell in order to anticipate the connection of a second additional SA section on the users bus. The dynamic adaptation of the hysteresis level is function on the parasitic capacitance value and the bus performance requirements, and the correct design permits to increase the margin in order to avoid double sectioning and to minimize the SA section connection delay in all duty cycle range (0% to 100%) of the S3R cell in PWM mode, avoiding phase shift in the bus voltage regulation loop.

In this way, after having received, at the time t1, the control signal INCTRi switching from the low level ViL to its high level ViH, the shunt switch of the cell S3Ri opens at a time t2 occurring before the above time t3. The users bus voltage Vbus starts to increase at the time t2 and the delay d2, equal to the time interval between t1 and t2, is shorter than the delay d3, equal to the time interval between t1 and t3. As a result, the bus voltage couldn't go down to the value VjL so that the cell S3Rj was not involved in this process. The double sectioning is thus avoided. It can be seen as the phase anticipator circuit PAC permits to mask the parasitic capacitance of the solar array panel.

It is also to be noted that, although the above description as been made in relation with a spacecraft, it is also possible to implement the invention in other kinds of vehicles, such as for instance a car or even a submarine where the solar array panels will then be replaced by nuclear power sources.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

What is claimed is:

1. A switch shunt regulator (S3R) having a power input terminal (INS3R) connected to a power source (SA) and coupled to a power output terminal (OUTS3R) to which a load is connected, said regulator comprising a comparator (OA, R1–R4) having a comparator output coupled to an input of a controlled shunt switch (SW, TR, R6–R7), said switch being connected between said power input terminal and a mass terminal (VSS), said comparator being adapted to activate said controlled shunt switch upon comparison of a voltage received at a control input (INCTR) of said regulator with a reference voltage applied at a reference input (Vref) of said comparator, and said comparator activating said controlled shunt switch a predetermined delay (d4=t4−t1) after having performed said comparison, characterized in that said switch shunt regulator (S3R) further comprises a phase anticipator circuit (PAC: DP, CP, R5) coupled between the output of said comparator (OA, R1–R4) and the input of said controlled shunt switch (SW, TR, R6–R7), said phase anticipator circuit being adapted to reduce the first mentioned predetermined delay (d4=t4−t1) between said comparator having performed said comparison and said switch being activated to a second predetermined delay (d2=t2−t1) relatively shorter than said first predetermined delay.

2. The switch shunt regulator (S3R) according to claim 1, characterized in that said comparator (OA, R1–R4) comprises an operational amplifier (OA) having a first comparison input (+) coupled to said control input (INCTR), a second comparison input (−) coupled to said reference input (Vref), and an output coupled to said comparator output and further to an input of said phase anticipator circuit (PAC: DP, CP, R5), and in that said phase anticipator circuit comprises a resistor (R5) and a capacitor (CP) coupled in parallel between said comparator output and said switch input, and further comprises a diode (DP) connected between said switch input and said mass terminal (VSS).

3. The switch shunt regulator according to claim 2, characterized in that said comparator (OA, R1–R4) comprises
 a first resistor (R1) connected between said control input (INCTR) and said first comparison input (+),
 a second resistor (R2) connected in feedback between the output of said operational amplifier and said first comparison input (+),
 a third resistor (R3) connected between the output of said operational amplifier and a supply voltage terminal (U++), and
 a fourth resistor (R4) connected between the output of said operational amplifier and said comparator output.

4. The switch shunt regulator according to claim 2, characterized in that said controlled shunt switch (SW, TR, R6–R7) comprises
 a switch (SW) coupled between said power input terminal (INS3R) and said mass terminal (VSS), and
 a driver circuit (TR, R6–R7) for said switch, comprising
  a sixth resistor (R6) connected between said switch input and said mass terminal (VSS), and
  a transistor (TR) having a main path coupled between said mass terminal (VSS) and a supply voltage terminal (U++) via a seventh resistor (R7), an input terminal of said transistor being connected to said switch input and an output terminal of said transistor controlling said switch (SW).

5. The switch shunt regulator according to claim 1, characterized in that, when said switch is activated, said power input terminal (INS3R) is disconnected from said mass terminal (VSS).

6. A power supply arrangement including a power conditioning and distribution unit (PDCU) having a plurality of arrangement input terminals (INSR01–INSR40) connected to outputs of power sources (SA01–SA40) and having a power output terminal (OUTS3R, Vbus) to which a load is connected,
 said power conditioning and distribution unit comprising a mean error amplifier (MEA) having a detection input connected to said power output terminal and control outputs connected to respective control inputs (INCTR01–INCTR40) of a plurality of sequential switch shunt regulators (S3R01–S3R40),
 each of said sequential switch shunt regulators (S3R: S3R01–S3R40) having a power input terminal (INS3R: INS3R01–INS3R40) connected to one of said power sources (SA: SA01–SA40) and having an output connected to said power output terminal (OUTS3R),
 each of said regulators further comprising a comparator (OA, R1–R4) having a comparator output coupled to an input of a controlled shunt switch (SW, TR, R6–R7), said switch being connected between said power input terminal and a mass terminal (VSS),
 said comparator being adapted to activate said controlled shunt switch upon comparison of a voltage received at the control input (INCTR) of the regulator (S3R) with a reference voltage applied at a reference input (Vref) of said comparator, and
 said comparator activating said controlled shunt switch a predetermined delay (d4=t4−t1) after having performed said comparison,
 characterized in that each of said switch shunt regulators (S3R: S3R01–S3R40) further comprises a phase anticipator circuit (PAC: DP, CP, R5) coupled between the output of said comparator (OA, R1–R4) and the input of said controlled shunt switch (SW, TR, R6–R7),
 said phase anticipator circuit being adapted to reduce the first mentioned predetermined delay (d4=t4−t1) between said comparator having performed said comparison and said switch being activated to a second predetermined delay (d2=t2−t1) relatively shorter than said first predetermined delay.

7. The power supply arrangement according to claim 6, characterized in that for each variation, by a predetermined voltage value, of the voltage (Vbus) at said power output terminal (OUTS3R), said mean error amplifier (MEA) switches an appropriated one of its control outputs (INCTRi, INCTRj) from a low value (ViL, VjL) to a high value (ViH, VjH), and vice versa.

8. The power supply arrangement according to claim 7, characterized in that the delay (d3=t3−t1) for the voltage (Vbus) at said power output terminal (OUTS3R) to change by said predetermined voltage value is shorter than said first predetermined delay (d4=t4−t1) and larger than said second predetermined delay (d2=t2−t1).

9. The power supply arrangement according to claim 6, characterized in that for each of the sequential switch shunt regulators (S3R: S3R01–S3R40):
 said comparator (OA, R1–R4) comprises an operational amplifier (OA) having a first comparison input (+) coupled to said control input (INCTR), a second comparison input (−) coupled to said reference input (Vref), and an output coupled to said comparator output and further to an input of said phase anticipator circuit (PAC: DP, CP, R5), and
 said phase anticipator circuit comprises a resistor (R5) and a capacitor (CP) coupled in parallel between said comparator output and said switch input, and further comprises a diode (DP) connected between said switch input and said mass terminal (VSS).

10. The power supply arrangement according to claim 6, characterized in that the switch shunt regulator (S3R) is used in a spacecraft,
 and in that said power sources (SA) are solar array panels (SA01–SA40).

* * * * *